(12) United States Patent
Ding et al.

(10) Patent No.: US 11,939,961 B2
(45) Date of Patent: Mar. 26, 2024

(54) METHOD AND SYSTEM OF POSITIVE AND NEGATIVE SEQUENCE ROTOR CURRENTS CONTROL FOR DOUBLY-FED INDUCTION GENERATOR-BASED WIND TURBINES UNDER SINGLE DQ-PI CONTROL STRUCTURE

(71) Applicant: SHANDONG UNIVERSITY, Shandong (CN)

(72) Inventors: Lei Ding, Shandong (CN); Xuesong Gao, Shandong (CN); Guofang Zhu, Shandong (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/079,431

(22) Filed: Dec. 12, 2022

(65) Prior Publication Data

US 2023/0250803 A1   Aug. 10, 2023

Related U.S. Application Data

(63) Continuation of application No. PCT/CN2021/111333, filed on Aug. 6, 2021.

(30) Foreign Application Priority Data

Aug. 7, 2020 (CN) .......................... 2020107903527

(51) Int. Cl.
*F03D 7/04* (2006.01)
*F03D 7/02* (2006.01)
(Continued)

(52) U.S. Cl.
CPC ........... *F03D 7/045* (2013.01); *F03D 7/0272* (2013.01); *F03D 7/0284* (2013.01); *H02P 9/007* (2013.01);
(Continued)

(58) Field of Classification Search
CPC ...... F03D 7/045; F03D 7/0272; F03D 7/0284; H02P 9/007; H02P 2101/15;
(Continued)

(56) References Cited

U.S. PATENT DOCUMENTS 8,619,915 B2   12/2013   Yamamoto
2011/0085621 A1   4/2011   Yamamoto

FOREIGN PATENT DOCUMENTS

CN   101141110 A   3/2008
CN   102082543 A   6/2011
(Continued)

OTHER PUBLICATIONS

Nov. 25, 2021 Notice of Allowance issued in Chinese Patent Application No. 202010790352.7.
(Continued)

*Primary Examiner* — Jacob M Amick
*Assistant Examiner* — Charles J Brauch
(74) *Attorney, Agent, or Firm* — Oliff PLC

(57) ABSTRACT

A method and system of positive and negative sequence rotor currents control for DFIG-WTs under a single dq-PI control structure includes: adjusting the negative sequence rotor current reference according to the negative sequence stator terminal voltage to obtain a reference adjustment value; converting the reference adjustment value to the forward-rotating dq coordinate system and superimposing it with the positive sequence rotor current reference as the input of a PI-regulator-based current feedback controller to uniformly control the positive and negative sequence rotor current; determining the output voltage reference of the rotor-side converter by the PI-regulator-based current feedback controller, according to which, the switching signal of the rotor-side converter can be determined through the SPWM function, controlling the turn-on and turn-off of the
(Continued)

bridge arms of the rotor-side converter to form the output voltage.$\vec{I}_{r\_ref\_*}$

9 Claims, 12 Drawing Sheets

(51) Int. Cl.
 *H02P 9/00* (2006.01)
 *H02P 101/15* (2016.01)

(52) U.S. Cl.
 CPC ...... *F05D 2270/54* (2013.01); *F05D 2270/71* (2013.01); *H02P 2101/15* (2015.01)

(58) Field of Classification Search
 CPC ...... H02P 21/0003; H02P 21/14; H02P 21/22; H02P 27/12; F05D 2270/54; F05D 2270/71; Y02E 10/76; H02J 3/00; H02J 3/381; H02J 2203/20; H02J 2300/28
 See application file for complete search history.

(56) References Cited

FOREIGN PATENT DOCUMENTS

| | | | |
|---|---|---|---|
| CN | 103219735 | A | 7/2013 |
| CN | 103227477 | A | 7/2013 |
| CN | 104242327 | A | 12/2014 |
| CN | 104538978 | A | 4/2015 |
| CN | 106329566 | A | 1/2017 |
| CN | 107623522 | A | 1/2018 |
| CN | 107658913 | A * | 2/2018 |
| CN | 107658913 | A | 2/2018 |
| CN | 107658913 | B | 11/2019 |
| CN | 111987953 | A | 11/2020 |
| WO | 2009/153838 | A1 | 12/2009 |

OTHER PUBLICATIONS

Nov. 9, 2021 International Search Report issued in International Patent Application No. PCT/CN2021/111333.
Nov. 9, 2021 Written Opinion of the International Searching Authority issued in International Patent Application No. PCT/CN2021/111333.
Jul. 28, 2021 Office Action issued in Chinese Patent Application No. 202010790352.7.

* cited by examiner

METHOD AND SYSTEM OF POSITIVE AND NEGATIVE SEQUENCE ROTOR CURRENTS CONTROL FOR DOUBLY-FED INDUCTION GENERATOR-BASED WIND TURBINES UNDER SINGLE DQ-PI CONTROL STRUCTURE

CROSS-REFERENCES TO RELATED APPLICATIONS

This application claims priority benefits to Chinese Patent Application No. 202010790352.7, filed 7 Aug. 2020, the contents of which are incorporated herein by reference.

TECHNICAL FIELD

The present invention belongs to the field of electric control technology of the wind turbine generator system, and particularly relates to a method and system of positive and negative sequence rotor currents control for doubly-fed induction generator (DFIG)-based wind turbines under a single dq-PI control structure.

BACKGROUND

Information of the related art part is merely disclosed to increase the understanding of the overall background of the present invention, but is not necessarily regarded as acknowledging or suggesting, in any form, that the information constitutes the prior art known to a person of ordinary skill in the art.

Under a balanced grid condition, the vector control based on stator voltage orientation is a mainstream control structure of a DFIG. Under a rotating dq coordinate system (forward-rotating dq coordinate system) oriented to the stator voltage vector, the feedback current control structure based on a proportion-integral (PI) regulator (hereinafter referred to as single dq-PI control structure) can effectively control the rotor current quickly and accurately, so as to control the power output of the DFIG.

However, under an unbalanced grid condition, the single dq-PI control structure is considered to be unable to effectively control the negative sequence component (a double frequency reversing rotating component in the forward-rotating dq coordinate system). Therefore, a widely used positive and negative sequence currents control structure with dual PI regulators in a double dq-PI (forward and reverse-rotating dq) coordinate system (hereinafter referred to as the double dq-PI control structure) has been proposed, i.e., setting up a PI regulator-based feedback control for the positive sequence rotor current in the forward-rotating dq coordinate system, and setting up a PI regulator-based feedback control for the negative sequence rotor current in the reverse-rotating dq coordinate system, which depends on the decomposition of the positive and negative sequence rotor currents. The decomposition affects the dynamic performance of the double dq-PI control structure both in balancing and unbalancing cases. The double dq-PI control structure increases the complexity of the control system and introduces a lot of control parameters, making it difficult to tune them well to get a satisfied dynamic performance. At present, the scheme of using the single dq-PI control structure in the balancing case to obtain good dynamic performance of the positive sequence current control and switching to the double dq-PI control structure in the unbalancing case to meet the control demand of the negative sequence current is commonly used.

In addition, there is also a proportion-resonant (PR) current control structure in a $\alpha\beta$ coordinate system, which unifies the control of positive and negative sequence currents in the $\alpha\beta$ coordinate system. However, because the ideal resonant controller cannot adapt to the frequency drift, the resonant controller with damping is used in practical applications, which leads to static errors. There is also a proportion-integral-resonant (PIR) current control structure in forward-rotating dq coordinate system, which unifies the control of the positive and negative sequence currents in the forward-rotating dq coordinate system, and has the same problem on the resonant controller like the PR control structure. Besides, the usage of the high order resonant controller also increases the complexity of the control system.

SUMMARY

To overcome the above shortcomings of the existing technologies, the present invention provides a method for realizing the control of positive and negative sequence rotor currents under the single dq-PI control structure, retaining the good control performance of the single dq-PI control structure on the positive sequence rotor current, and giving it satisfying ability to control negative sequence rotor current under unbalancing condition.

To achieve the above, one or more examples of the present invention provide the following technical solutions:

In the first aspect, disclosing a method of positive and negative sequence rotor currents control for a DFIG under a single dq-PI control structure, comprising:
  extracting positive and negative sequence components of a stator voltage of a DFIG;
  tracking and phase locking the positive sequence component of the stator voltage to establish a forward-rotating dq coordinate system;
  adjusting a negative sequence rotor current reference according to the negative sequence stator voltage to obtain a reference adjustment value of the negative sequence rotor current;
  superimposing the reference adjustment value of the negative sequence rotor current with a positive sequence rotor current reference in the forward-rotating dq coordinate system to get a synthesis signal;
  determining an output voltage reference of a rotor-side converter by a PI-regulator-based current feedback controller with the synthesis signal as the input; and
  generating a sequence of switching signal of the rotor-side converter according to the voltage reference generated by the PI-regulator-based current feedback controller, controlling the turn-on and turn-off of the bridge arms of the rotor-side converter.

The control method enables the single dq-PI control structure to have control ability on the positive and negative sequence rotor currents under the unbalancing condition, making the positive and negative sequence rotor current equal to the positive and negative sequence rotor current reference.

In the second aspect, disclosing a system of positive and negative sequence rotor currents control for a DFIG under a single dq-PI control structure, comprising:
  a positive and negative sequence stator voltages extraction module, being configured to extract positive and negative sequence components of a stator voltage of a DFIG;
  a positive sequence stator voltage phase-locked-loop module, being configured to track and phase lock the positive sequence stator voltage to establish a forward-rotating dq coordinate system;

a negative sequence current reference adjustment module, being configured to adjust a negative sequence rotor current reference according to the negative sequence stator voltage to obtain a reference adjustment value of the negative sequence rotor current;

a rotor current reference synthesis module, being configured to superimpose the reference adjustment value of the negative sequence rotor current with a positive sequence rotor current reference in the forward-rotating dq coordinate system to get a synthesis signal;

a rotor current feedback control module, being configured to generate an output voltage reference of a rotor-side converter with the synthesis signal as the input; and a switching signal module, being configured to obtain a sequence of switching signal of the rotor-side converter according to the output voltage reference, and control the turn-on or turn-off of the bridge arms of the rotor-side converter.

The following beneficial effects exist in one or more of the above technical solutions:

According to the technical solution of the present invention, a negative sequence rotor current reference adjustment function is added to a DFIG under a single dq-PI control structure, which retains the good control performance of the control structure for positive sequence rotor currents and gives it control ability for the negative sequence rotor currents with good dynamic performance under unbalancing conditions.

The technical solution of the present invention does not require a switching of the control structure when the DFIG changes from balanced to unbalanced operation, greatly reduces the complexity and the order of the control system.

The advantages of additional aspects of the present invention will be set forth in part in the description which follows, and in part will be obvious from the description, or may be learned by practice of the invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

Figure 1:
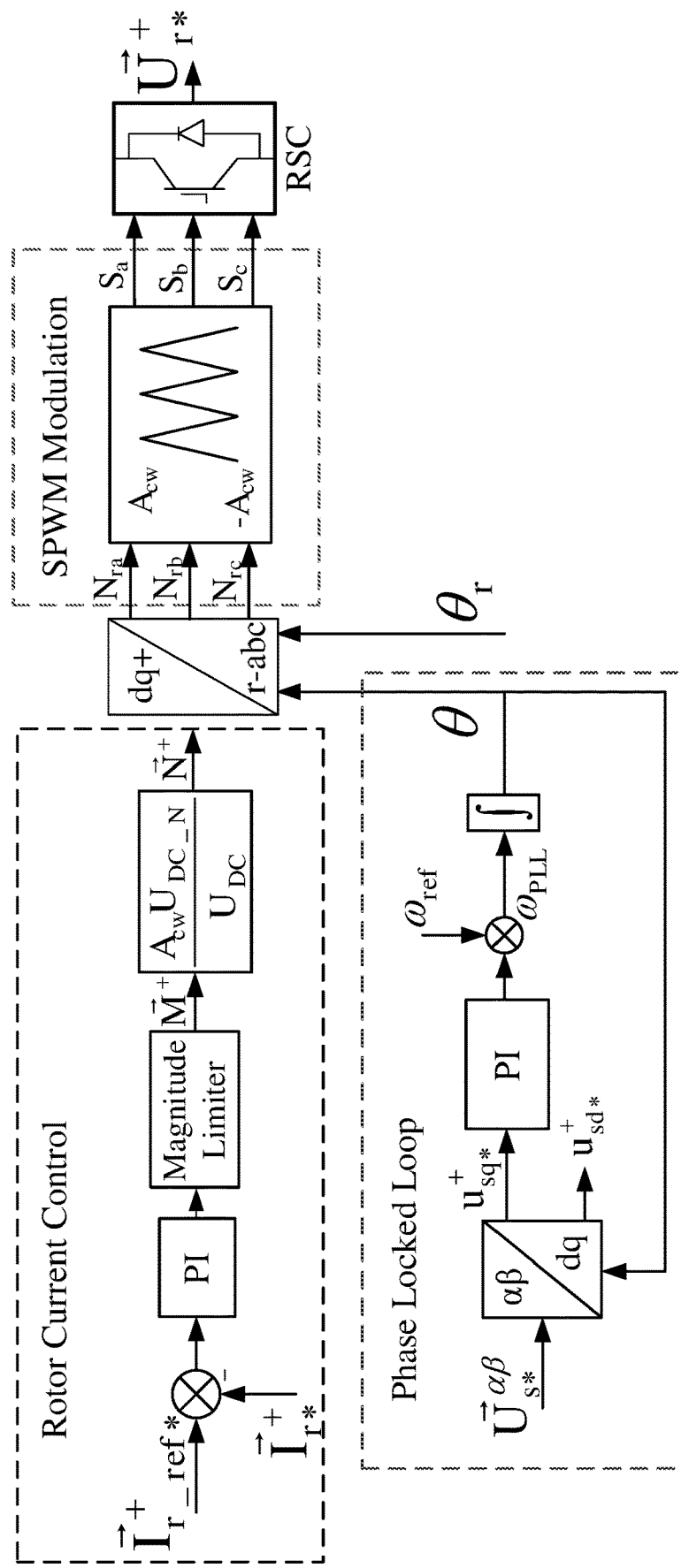
FIG. 1 is a diagram of a classical single dq-PI control structure of a DFIG.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

The embodiments and features of the embodiments in the present invention may be combined with each other without conflict.

| BRIEF DESCRIPTION OF THE SYMBOLS | |
|---|---|
| Subscript | |
| * | Per unit |
| + | Positive sequence component |
| − | Negative sequence component |
| superscript | |
| + | Variable in forward-rotating dq coordinate system |
| − | Variable in reverse-rotating dq coordinate system |
| αβ | Variable in two-phase stationary coordinate system |
| Variables | |
| $\vec{U}_s$ | Stator voltage |
| $\vec{U}_r$ | Output voltage of rotor-side converter |
| $\vec{U}_i$ | Integrating output voltage of rotor-side converter |
| $U_B$ | Base value of stator line-to-line voltage |
| $u_{sd}$ | d-axis component of stator voltage in rotating coordinate system |
| $u_{sq}$ | q-axis component of stator voltage in rotating coordinate system |
| $u_{s\alpha}$ | a-axis component of stator voltage in two-phase stationary coordinate system |
| $u_{s\beta}$ | ß-axis component of stator voltage in two-phase stationary coordinate system |
| $\hat{u}_{s\alpha}$ | Estimated value of a-axis component of stator voltage |
| $\hat{u}_{s\beta}$ | Estimated value of ß-axis component of stator voltage |
| $\hat{u}'_{s\alpha}$ | Orthogonal component of estimated value of a-axis component of stator voltage |
| $\hat{u}'_{s\beta}$ | Orthogonal component of estimated value of ß-axis component of stator voltage |
| $\vec{\psi}_s$ | Stator flux |
| $\vec{\psi}_r$ | Rotor flux |
| $\vec{I}_s$ | Stator current |
| $\vec{I}_r$ | Rotor current |
| $\vec{I}_{r\_ref}$ | Rotor current reference value |
| $\vec{I}_{r\_com}$ | Rotor current reference adjustment value |
| $R_s$ | Stator resistance |
| $R_r$ | Rotor resistance |
| $L_s$ | Stator inductance |
| $L_r$ | Rotor inductance |
| $L_m$ | Stator and rotor mutual inductance |
| $U_{DC}$ | DC Voltage |
| $U_{DC\_N}$ | Rated DC voltage |
| $\omega_{PLL}$ | Rotational speed of phase-locked loop |
| $\omega_i$ | Integrated rotational speed of phase-locked loop |
| $\omega_r$ | Rotational speed of Rotor |
| $\omega_{ref}$ | Reference value of rotational speed of phase-locked loop |
| $\omega_B$ | Base value of rotational speed |
| θ | Angle of forward-rotating dq coordinate system |
| $\theta_r$ | Angle of rotor coordinate system |
| $\vec{N}$ | Output signal of rotor current controller |
| $\vec{M}$ | Modulation signal |
| $M_a$ | A-phase modulating signal of rotor |
| $M_b$ | B-phase modulating signal of rotor |
| $M_c$ | C-phase modulating signal of rotor |
| $S_a$ | A-phase switching signal of rotor-side converter |
| $S_b$ | B-phase switching signal of rotor-side converter |
| $S_c$ | C-phase switching signal of rotor-side converter |
| $A_{cw}$ | Amplitude of triangular carrier signal |
| K | Stator and rotor winding turns ratio |
| $K_{mod}$ | Constant factor between modulating signal M and per unit of output voltage of rotor-side converter (in the example, it is $\sqrt{6}KU_{DC\_N}/4/U_B$) |
| $K_p$ | Scale factor of rotor current controller |
| $K_i$ | Integration factor of rotor current controller |

Example 1

The present example discloses a method of positive and negative sequence rotor currents control for a DFIG under a single dq-PI control structure, comprising:

extracting positive and negative sequence components of a stator voltage of a DFIG;

tracking and phase locking the positive sequence stator voltage to establish a forward-rotating dq coordinate system;

adjusting a negative sequence rotor current reference according to the negative sequence stator voltage to obtain a reference adjustment value of the negative sequence rotor current;

superimposing the reference adjustment value of the negative sequence rotor current with a positive sequence rotor current reference in the forward-rotating dq coordinate system to get a synthesis signal;

generating an output voltage reference of a rotor-side converter by the PI-regulator-based current feedback controller with the synthesis signal as the input; and generating a sequence of switching signal of the rotor-side converter according to the output voltage reference, determining the turn-on or turn-off of switching devices to control the output voltage of the rotor-side converter.

Specifically, the present example comprises the following functions:
- a stator voltage decomposing function, for extracting and decomposing positive and negative sequence components of the stator voltage of the DFIG based on a second-order generalized integrator;
- a phase-locked-loop function, for tracking and phase locking the positive sequence stator voltage vector to provide a reference angle for a series of coordinate conversions and the current control;
- a negative sequence rotor current reference adjustment function, for adjusting a negative sequence rotor current reference according to the negative sequence stator voltage to obtain a reference adjustment value of the negative sequence rotor current;
- a rotor current reference synthesis function, for superimposing the negative sequence current reference adjustment value and the positive sequence rotor current reference value in the forward-rotating dq coordinate system to get a synthesis signal;
- a PI-regulator-based current feedback controller function, for generating an output voltage reference of a rotor-side converter by inputting the error between the synthesis signal and a measurement rotor current in the forward-rotating coordinate system to a PI regulator;
- an SPWM (Sinusoidal Pulse Width Modulation) function, for forming the switching signal of the rotor-side converter by comparing the three-phase modulation signal and a triangular carrier signal, to control the turn-on and turn-off of the bridge arms of the rotor-side converter; and
- a coordinate systems conversion function, comprising converting stator three-phase voltages into a stationary coordinate system, converting the positive and negative sequence stator voltages in the stationary coordinate system into the forward- and reverse-rotating dq coordinate system, converting rotor three-phase currents into the forward-rotating dq coordinate system, converting the negative sequence rotor current reference adjustment value into the forward-rotating dq coordinate system and converting the output voltage reference into a rotor three-phase coordinate system to form a three-phase modulation signal, etc.

The present example starts from the analysis of the response of the DFIG under the classical single dq-PI control structure under unbalanced grid conditions. It is found that the DFIG under this single dq-PI control structure also has the potential to control the negative sequence rotor current under unbalanced grid conditions. According to the analysis, an adjustment function for the original reference of the negative sequence rotor current has been designed, which enables the DFIG under the single dq-PI control structure to have good control ability on the negative sequence rotor current; meanwhile, the good control performance of the single dq-PI control structure on the positive sequence rotor current is remained. Compared with the other existing control structure, the control structure of the example does not need to be switched when the DFIG changes from balancing to unbalancing operation, and reduces the complexity and the order of the control system.

The electromagnetic transient simulation models of the DFIG with the proposed single dq-PI control structure, and with the double dq-PI control structure are built in the DIgSILENT PowerFactory software. The responses of the two models under unbalanced grid disturbances are compared. The results show that the proposed positive and negative sequence rotor current control method based on the single dq-PI control structure has the superior dynamic performance with a more simple control system.

Figure 2:
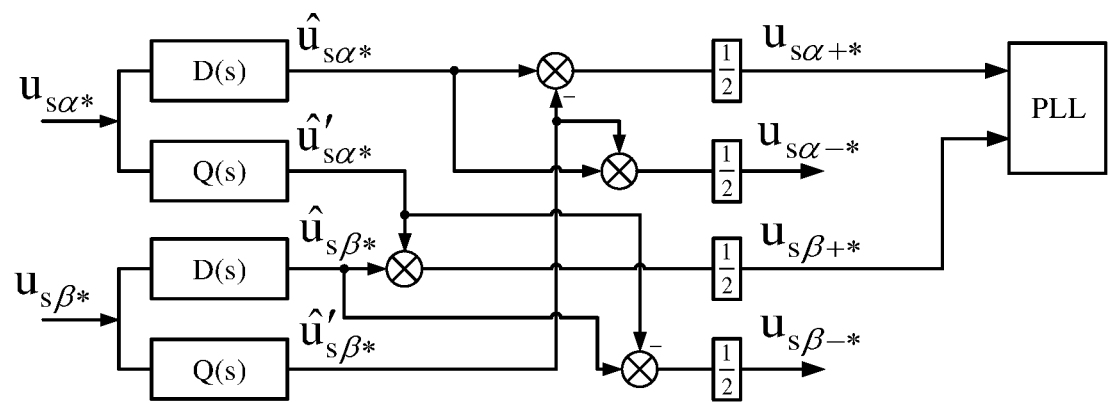
FIG. 2 is a diagram of extraction and decomposition of positive and negative sequence voltages based on a second-order generalized integrator.

I. Analysis of the response of the DFIG under the classical single dq-PI control structure under an unbalanced grid disturbance Under a balanced grid condition, the classic single dq-PI control structure of the doubly-fed wind generator with grid voltage orientation is shown in FIG. 1. The response of this control structure under unbalanced grid conditions will be studied. The phase-locked loop is improved to track the phase of the stator positive sequence voltage to establish a forward-rotating dq coordinate system. The second-order generalized integrator method is used to decompose the positive and negative sequence components of the stator voltage in the two-phase stationary αβ coordinate system, as shown in FIG. 2, wherein, $$D(s) = \frac{k\omega s}{s^2 + k\omega s + \omega^2} \qquad (1)$$
$$Q(s) = \frac{k\omega^2}{s^2 + k\omega s + \omega^2}$$

Simultaneously, a negative sequence component is added into the current reference. This component is an AC quantity with a double base frequency under the forward-rotating dq coordinate system.

A state space equation with the stator current, the rotor current, and the rotor-side converter integration output voltage as state variables for this control structure in the forward-rotating dq coordinate system is established, as shown in Eq. (2).

$$\begin{bmatrix} \dot{I}_{s^*}^+ \\ \dot{I}_{r^*}^+ \\ \dot{U}_{i^*}^+ \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} I_{s^*}^+ \\ I_{r^*}^+ \\ U_{i^*}^+ \end{bmatrix} + \begin{bmatrix} B_{11} & B_{12} \\ B_{21} & B_{22} \\ B_{31} & B_{32} \end{bmatrix} \begin{bmatrix} U_{s^*}^+ \\ I_{r\_ref^*}^+ \end{bmatrix} \qquad (2)$$

wherein, $$A_{11} = \omega_B \frac{-R_{s^*}L_{r^*} + j[(\omega_{PLL^*} - \omega_{r^*})L_{m^*}^2 - \omega_{PLL^*}L_{s^*}L_{r^*}]}{L_{r^*}L_{s^*} - L_{m^*}^2} \qquad (3)$$

$$A_{12} = \omega_B \frac{(K_{mod}K_p + R_{r^*})L_{m^*} - j\omega_{r^*}L_{r^*}L_{m^*}}{L_{r^*}L_{s^*} - L_{m^*}^2}$$

$$A_{13} = \frac{-\omega_B L_{m^*}}{L_{r^*}L_{s^*} - L_{m^*}^2}$$

$$A_{21} = \omega_B \frac{R_{s^*}L_{m^*} + j\omega_{r^*}L_{s^*}L_{m^*}}{L_{r^*}L_{s^*} - L_{m^*}^2}$$

$$A_{22} = \omega_B \frac{-(K_{mod}K_p + R_{r^*})L_{s^*} + j[\omega_{PLL^*}L_{m^*}^2 - (\omega_{PLL^*} - \omega_{r^*})L_{s^*}L_{r^*}]}{L_{r^*}L_{s^*} - L_{m^*}^2}$$

$$A_{23} = \frac{\omega_B L_{s^*}}{L_{r^*}L_{s^*} - L_{m^*}^2} \quad A_{31} = 0 \quad A_{32} = -K_{mod}K_i \quad A_{33} = 0$$

$$B_{11} = \frac{\omega_B L_{r^*}}{L_{r^*}L_{s^*} - L_{m^*}^2} \quad B_{12} = -\frac{\omega_B K_{mod}K_p L_{m^*}}{L_{r^*}L_{s^*} - L_{m^*}^2}$$

$$B_{21} = -\frac{\omega_B L_{m^*}}{L_{r^*}L_{s^*} - L_{m^*}^2} \quad B_{22} = \frac{\omega_B K_{mod}K_p L_{s^*}}{L_{r^*}L_{s^*} - L_{m^*}^2}$$

$$B_{31} = 0 \quad B_{32} = K_{mod}K_i$$

The response of the doubly-fed wind turbine with the single dq-PI control structure under an unbalanced stator voltage step disturbance will be analyzed. The phase-locked loop dynamics is ignored, that means, the forward-rotating dq coordinate system is considered to immediately overlap with the positive sequence stator voltage vector after the disturbance. The DFIG is assumed to operate in a balanced steady state before the disturbance.

The response of the DFIG to the unbalanced stator voltage step disturbance is decomposed into two parts: the positive sequence response and the negative sequence response.

The positive sequence response can be described by the state-space equation shown in Eq. (4).

$$\begin{bmatrix} \dot{I}_{s*}^+ \\ \dot{I}_{r*}^+ \\ \dot{U}_{i*}^+ \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} I_{s*}^+ \\ I_{r*}^+ \\ U_{i*}^+ \end{bmatrix} + \begin{bmatrix} B_{11} & B_{12} \\ B_{21} & B_{22} \\ B_{31} & B_{32} \end{bmatrix} \begin{bmatrix} \vec{U}_{s+*}^+ \\ \vec{I}_{r\_ref+*}^+ \end{bmatrix} \quad (4)$$

wherein, the initial value of each state variable is equal to the steady-state value of the corresponding variable before the disturbance. The inputs to the state space equation are $\vec{U}_{s+*}^+$ (the positive sequence stator voltage in the forward-rotating dq coordinate system) and $\vec{I}_{r\_ref+*}^+$ (the positive sequence rotor current reference in the forward-rotating dq coordinate system).

The negative sequence response can be described by the state space equation shown in Eq. (5).

$$\begin{bmatrix} \dot{I}_{s*}^+ \\ \dot{I}_{r*}^+ \\ \dot{U}_{i*}^+ \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} I_{s*}^+ \\ I_{r*}^+ \\ U_{i*}^+ \end{bmatrix} + \begin{bmatrix} B_{11} & B_{12} \\ B_{21} & B_{22} \\ B_{31} & B_{32} \end{bmatrix} \begin{bmatrix} \vec{U}_{s-*}^+ \\ \vec{I}_{r\_ref-*}^+ \end{bmatrix} \quad (5)$$

wherein, the initial value of each state variable is 0. The inputs to the state space equation are $\vec{U}_{s-*}^+$ (the negative sequence stator voltage in the forward-rotating dq coordinate system) and $\vec{I}_{r\_ref-*}^+$ (the negative sequence rotor current reference in the forward-rotating dq coordinate system). The $\vec{U}_{s-*}^+$ and $\vec{I}_{r\_ref-*}^+$ are both AC quantities with a double base frequency in the forward dq coordinate system. To simplify the analysis, the equation is converted to the reverse-rotating dq coordinate system, the angle of which is equal to the minus angle of the forward-rotating dq coordinate system, as shown in Eq. (6).

$$\begin{bmatrix} \dot{I}_{s*}^- \\ \dot{I}_{r*}^- \\ \dot{U}_{i*}^- \end{bmatrix} = \begin{bmatrix} A'_{11} & A_{12} & A_{13} \\ A_{21} & A'_{22} & A_{23} \\ A_{31} & A_{32} & A'_{33} \end{bmatrix} \begin{bmatrix} I_{s*}^- \\ I_{r*}^- \\ U_{i*}^- \end{bmatrix} + \begin{bmatrix} B_{11} & B_{12} \\ B_{21} & B_{22} \\ B_{31} & B_{32} \end{bmatrix} \begin{bmatrix} \vec{U}_{s-*}^- \\ \vec{I}_{r\_ref-*}^- \end{bmatrix} \quad (6)$$

wherein, $A'_{11} = A_{11} + j2\omega_{PLL}*\omega_B$ $A'_{22} = A_{22} + j2\omega_{PLL}*\omega_B \quad (7)$ $A'_{33} = A_{33} + j2\omega_{PLL}*\omega_B$ The $\vec{U}_{s-*}^-$ and $\vec{I}_{r\_ref-*}^-$ are both DC quantities in the reverse-rotating dq coordinate system. It should be noted that the coordinate conversion here is for analytical convenience and does not change the fact that there is only one PI-regulator-based current feedback controller in the forward-rotating dq coordinate system.

The positive sequence response is equivalent to the response of the DFIG under the classical single dq-PI control structure under a balanced stator voltage disturbance, where the positive sequence rotor current is accurately controlled to the positive sequence rotor current reference, together with a transient flux decaying. When the positive sequence rotor current reference changes, the positive sequence rotor current has a good tracking dynamic.

The negative sequence response is worth to be focused more on. The negative sequence response of the DFIG under the single dq-PI control structure in the reverse-rotating dq coordinate system can be calculated by the Eq. (6). Calculations are executed for the following scenarios:

$\vec{U}_{s-*}^-$ is equal to 0.1, $\vec{I}_{r\_ref-*}^-$ is equal to $-j0.3$ during 0 to 0.8 s, and is equal to $-j0.6$ after 0.8 s, the parameters of the DFIG under the single dq-PI control structure are shown in Table 1.

TABLE 1

| Parameters of the DFIG | | | |
|---|---|---|---|
| $U_B$ | 690 V | K | 690/2000 |
| $R_{s*}$ | 0.01 | $R_{r*}$ | 0.01 |
| $L_{s*}$ | 3.6 | $L_{r*}$ | 3.6 |
| $L_{m*}$ | 3.5 | $K_p$ | 0.6 |
| $K_i$ | 40 | $U_{DC\_N}$ | 1150 V |

Figure 3:
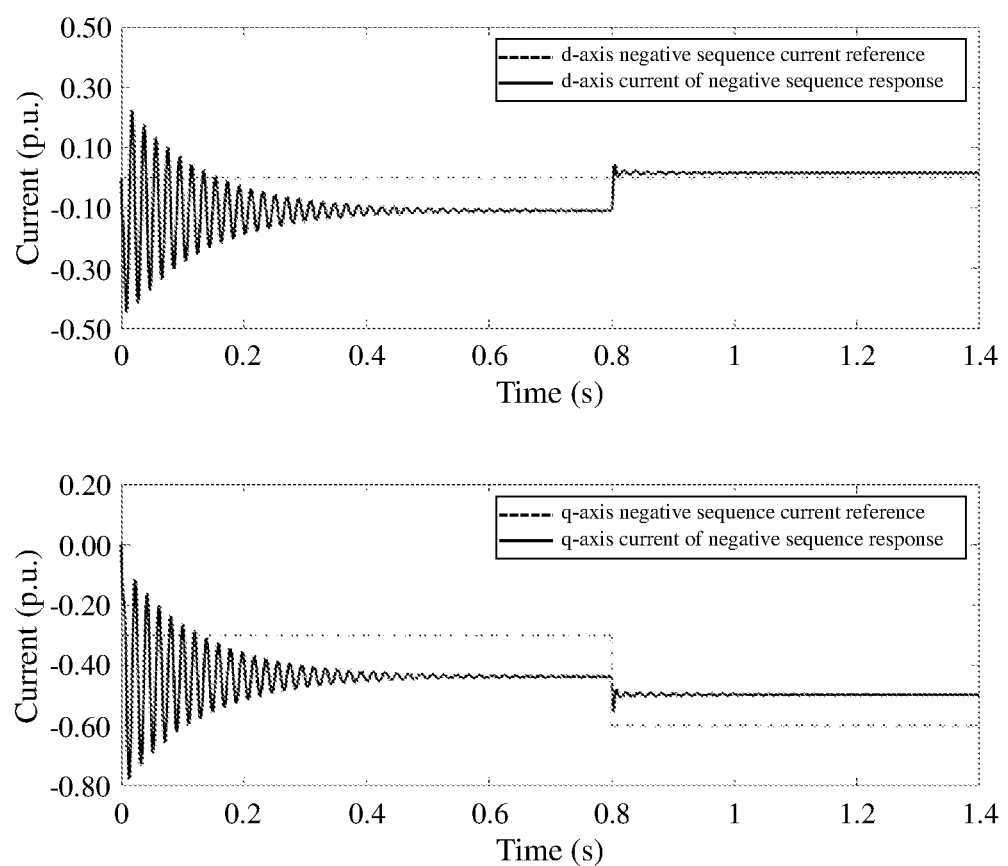
FIG. 3 is a comparison diagram of d- and q-axis rotor currents of a negative sequence response and d-axis and q-axis negative sequence rotor current reference of a DFIG in a reverse-rotating dq coordinate system under the classical single dq-PI control structure.

The negative sequence response rotor current of the DFIG under the classical single dq-PI control structure is calculated in the reverse-rotating dq coordinate system according to Eq. (6) as shown in FIG. 3.

It can be seen that with the transient flux decaying caused by the negative sequence voltage disturbance, a stable negative sequence rotor current is obtained, but there is a large steady-state error between this negative sequence rotor current and the negative sequence rotor current reference value. After 0.8 s, the negative sequence rotor current reference value is changed, and the negative sequence rotor current can transit to a new steady-state negative sequence rotor current quickly with a small transient over-shoot, but there is still a steady-state error between this value and the reference value. If we can find the relationship between the steady-state negative rotor current and the negative rotor current reference under the classical single dq-PI control structure and adjust the negative rotor current reference according to the relationship to make the obtained steady-state negative rotor current just equal to the original negative rotor current reference, the DFIG under the single dq-PI control structure can get the negative rotor current control ability with good dynamic performance.

II. Design of the Negative Sequence Rotor Current Control for the DFIG Under the Single Dq-PI Control Structure The DFIG under the single dq-PI control structure can respond quickly with a small transient over-shoot to the negative sequence rotor current reference, but there is a large static error between the steady-state response and the reference value. It is necessary to find the relationship between the negative sequence rotor current reference and the steady-state negative sequence rotor current in the single dq-PI control structure, and add an adjustment function to the original negative sequence rotor current reference, so that the obtained steady-state negative sequence rotor current can be exactly equal to the original negative sequence rotor current reference. For this purpose, the steady-state negative sequence response of the classical DFIG under the single dq-PI control structure is analyzed.

In the reverse-rotating dq coordinate system, the negative sequence components of the DFIG under the single dq-PI control structure satisfy a steady-state equation shown in Eq. (8).

$$\vec{U}_{s_-*}^- = R_{s*}\vec{I}_{s_-*}^- - j\omega_{PLL*}L_{s*}\vec{I}_{s_-*}^- - j\omega_{PLL*}L_{m*}\vec{I}_{r_-*}^-$$

$$\vec{U}_{r_-*}^- = R_{r*}\vec{I}_{r_-*}^- - j(\omega_{PLL*}+\omega_{r*})L_{m*}\vec{I}_{s_-*}^- - j(\omega_{PLL*}+\omega_{r*})L_{r*}\vec{I}_{r_-*}^-  \quad (8)$$

The output voltage of the rotor-side converter is generated by the PI-regulator-based current feedback controller, which acts in the forward-rotating dq coordinate system. Firstly, the expression for the output voltage of the rotor-side converter formed by the reaction of the PI-regulator-based current feedback controller on the negative sequence rotor current reference under the forward-rotating dq coordinate system is as shown in Eq. (9).

$$\vec{U}_{r_-*}^+ = K_p K_{mod}\left(\vec{I}_{r\_ref-*}^+ - \vec{I}_{r_-*}^+\right) + \vec{U}_{i_-*}^+ \quad (9)$$

$$\frac{d\vec{U}_{i_-*}^+}{dt} = K_i K_{mod}\left(\vec{I}_{r\_ref-*}^+ - \vec{I}_{r_-*}^+\right)$$

Converting Eq. (9) to the reverse-rotating dq coordinate system, to derive Eq. (10):

$$\vec{U}_{r_-*}^- = K_p K_{mod}\left(\vec{I}_{r\_ref-*}^- - \vec{I}_{r_-*}^-\right) + \vec{U}_{i_-*}^- \quad (10)$$

$$\frac{d\vec{U}_{i_-*}^-}{dt} = K_i K_{mod}\left(\vec{I}_{r\_ref-*}^- - \vec{I}_{r_-*}^-\right) + j2\omega_{PLL*}\omega_B \vec{U}_{i_-*}^-$$

For the analyzed negative sequence steady state, Eq. (11) is satisfied:

$$\frac{d\vec{U}_{i_-*}^-}{dt} = K_i K_{mod}\left(\vec{I}_{r\_ref-*}^- - \vec{I}_{r_-*}^-\right) + j2\omega_{PLL*}\omega_B \vec{U}_{i_-*}^- = 0 \quad (11)$$

Thus, the following equation, that is, Eq. (12) can be obtained:

$$\vec{U}_{i_-*}^- = j\frac{K_i K_{mod}\left(\vec{I}_{r\_ref-*}^- - \vec{I}_{r_-*}^-\right)}{2\omega_{PLL*}\omega_B} \quad (12)$$

According to Eqs. (8), (10) and (12), Eq. (13) can be obtained:

$$\vec{I}_{r_-*}^- = K_{ref}\vec{I}_{r\_ref-*}^- + K_{U_{neg}}\vec{U}_{s_-*}^- \quad (13)$$

wherein, $$K_{ref} = \frac{K_{mod}K_p + j\frac{K_{mod}K_i}{2\omega_{PLL*}\omega_B}}{A + jB} \quad (14)$$

$$K_{U_{ref}} = \frac{\frac{(\omega_{PLL*}+\omega_{r*})(-\omega_{PLL*}L_{s*}+jR_{s*})L_{m*}}{R_{s*}^2+\omega_{PLL*}^2 L_{s*}^2}}{A + jB}$$

$$A = R_{r*} + K_{mod}K_p + \frac{\omega_{PLL*}(\omega_{PLL*}+\omega_{r*})R_{s*}L_{m*}^2}{R_{s*}^2+\omega_{PLL*}^2 L_{s*}^2}$$

$$B = \frac{K_{mod}K_i}{2\omega_{PLL*}\omega_B} + \frac{\omega_{PLL*}^2(\omega_{PLL*}+\omega_{r*})L_{s*}L_{m*}^2}{R_{s*}^2+\omega_{PLL*}^2 L_{s*}^2} - (\omega_{PLL*}+\omega_{r*})L_{r*}$$

Eq. (13) reveals the relationship between the steady-state negative sequence rotor current and the negative sequence rotor current reference as well as the negative sequence stator voltage under the single dq-PI control structure. To make the steady-state negative sequence rotor current equal to the negative rotor current reference, it is necessary to adjust the original negative rotor current reference $\vec{I}_{r\_ref-*}^-$ to obtain the reference adjustment value $\vec{I}_{r\_com-*}^-$. Then $\vec{I}_{r\_com-*}^-$ is converted to the forward-rotating dq coordinate system and superimposed on the positive rotor current reference, together as the input to the PI-regulator-based current feedback controller, so that the steady-state negative sequence rotor current may be equal to $\vec{I}_{r\_ref-*}^-$. The conversion relationship between $\vec{I}_{r\_com-*}^-$ and $\vec{I}_{r\_ref-*}^-$ is shown in Eq. (15):

$$\vec{I}_{r\_com-*}^- = \frac{\vec{I}_{r\_ref-*}^- - K_{U_{neg}}\vec{U}_{s-*}^-}{K_{ref}} \quad (15)$$

It needs to be noticed that, $K_{ref}$ and $K_{U_{neg}}$ vary with $\omega_{PLL*}$ and $\omega_{r*}$, and need to be updated in real-time according to $\omega_{PLL*}$ and $\omega_{r*}$. In addition, Eqs. (13) and (15) can be converted to any coordinate system without changing the relationship between the variables, i.e., the conversion relationship between the rotor current reference value and the reference adjustment value is valid in any coordinate system, not only in the reverse-rotating dq coordinate system. The original negative sequence rotor current reference can be given in any coordinate system, and then the original current reference is adjusted according to the negative sequence stator voltage in the corresponding coordinate system to obtain the reference adjustment value. But finally, the reference adjustment value always needs to be converted to the forward-rotating dq coordinate system and then superimposed with the positive sequence rotor current reference value in the forward-rotating dq coordinate system as the input to the PI-regulator-based current feedback controller. By considering that the negative sequence components are DC quantities in the reverse-rotating dq coordinate system, which are simpler in form, the original negative sequence rotor current reference is chosen to give in the reverse-rotating dq coordinate system.

Figure 4:
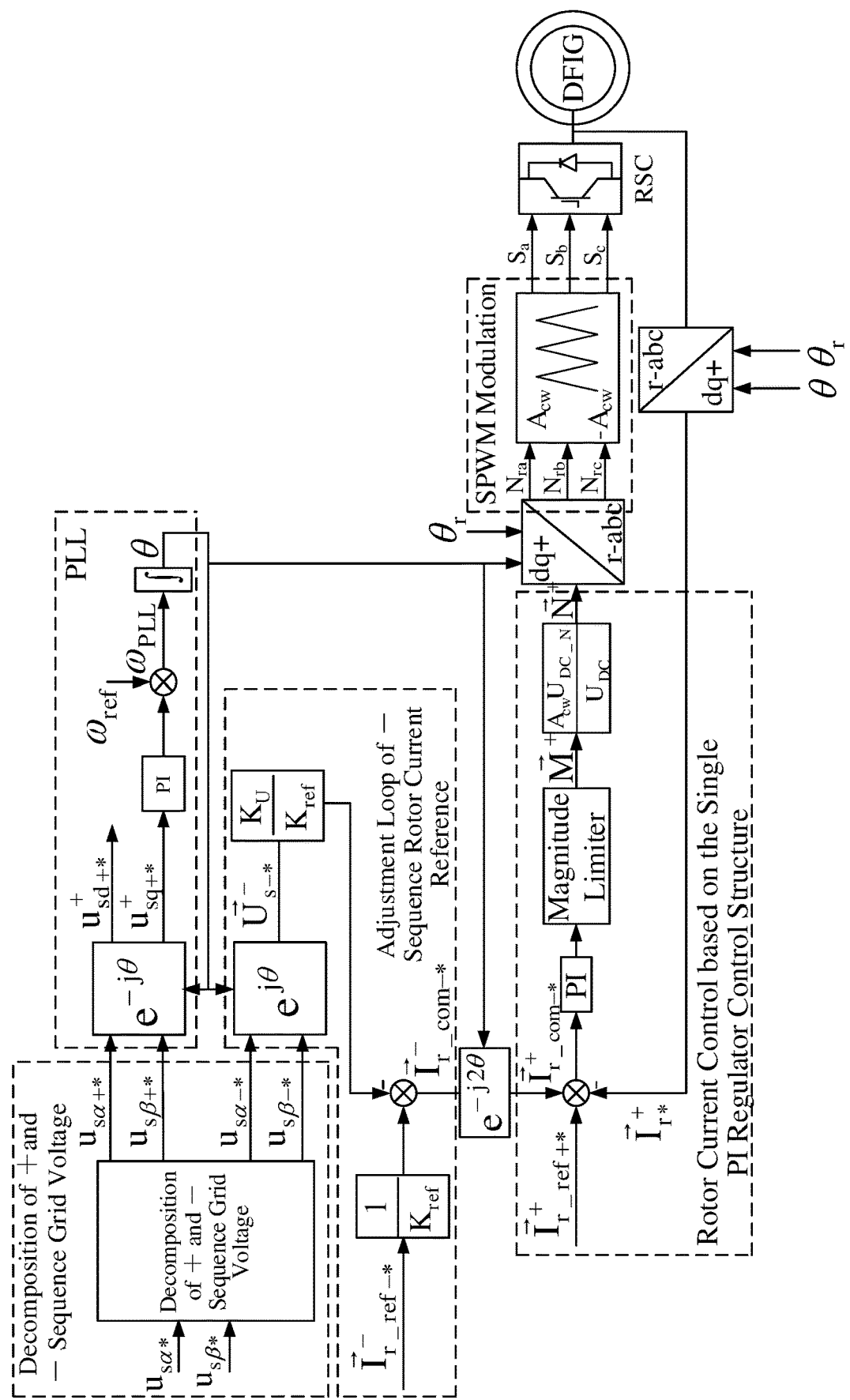
FIG. 4 is a block diagram of positive and negative sequence rotor currents control structure under the single dq-PI control structure.

The complete block diagram of the positive and negative sequence rotor currents control of the DFIG under the single dq-PI control structure is shown FIG. 4.

The Specific Process is as Follows:

The positive and negative sequence components of the stator voltage are decomposed in the αβ coordinate system by using the second-order generalized integrator. The positive sequence component is input to the phase-locked loop to form the forward-rotating dq coordinate system. The negative sequence component is used to adjust the original negative sequence rotor current reference. The positive sequence rotor current reference in the forward-rotating dq coordinate system and the negative sequence rotor current reference in the reverse-rotating dq coordinate system are given. The reference adjustment value of the negative sequence rotor current $\vec{I}_{r\_com-*}^{-}$ is obtained after adjusting the negative sequence rotor current reference according to Eq. (15), and then is converted into the forward-rotating dq coordinate system and superimposed on the positive rotor current reference as the input to the PI-regulator-based current feedback controller. The PI-regulator-based current feedback controller generates the output voltage reference of the rotor-side converter, according to which, the switching signal of the rotor-side converter can be determined through the SPWM function, controlling the turn-on and turn-off of the bridge arms of the rotor-side converter to form the output voltage. Based on the above processes, the control on the positive and negative sequence rotor currents can be realized under the single dq-PI control structure.

III. Simulation Verification

Figure 5:
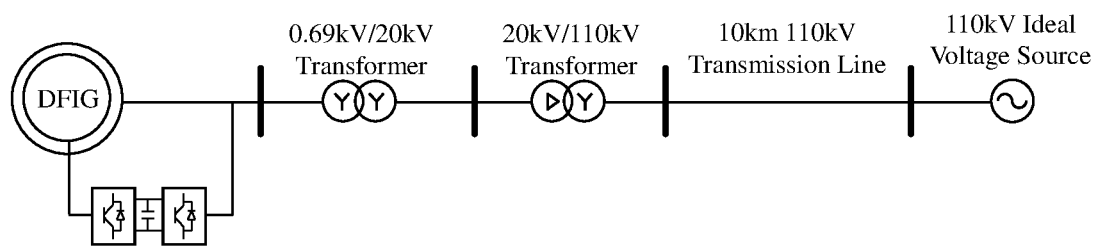
FIG. 5 is a schematic diagram of a simulation system of examples of the present invention.

A grid-connected electromagnetic transient simulation model of the DFIG with the proposed control structure in the present invention is established in DIgSILENT PowerFactory software. The control diagram of the DFIG is shown in FIG. 4. The parameters of the DFIG are shown in Table 1. The simulation system diagram is shown in FIG. 5.

An unbalancing fault occurs on the 10 km line. After the fault, the positive sequence rotor current reference value $\vec{I}_{r\_ref+*}^{+}$ is maintained and the negative sequence rotor current reference value follows the relationship shown in Eq. (16).

$$\vec{I}_{r\_ref-*}^{-} = -jK_{Q_{neg}}\vec{U}_{s-*}^{-} \qquad (16)$$

That is, the negative sequence rotor current makes the DFIG absorb negative sequence reactive power to reduce the negative sequence stator voltage and reduce the degree of the unbalancing of the stator voltage.

Figure 6:
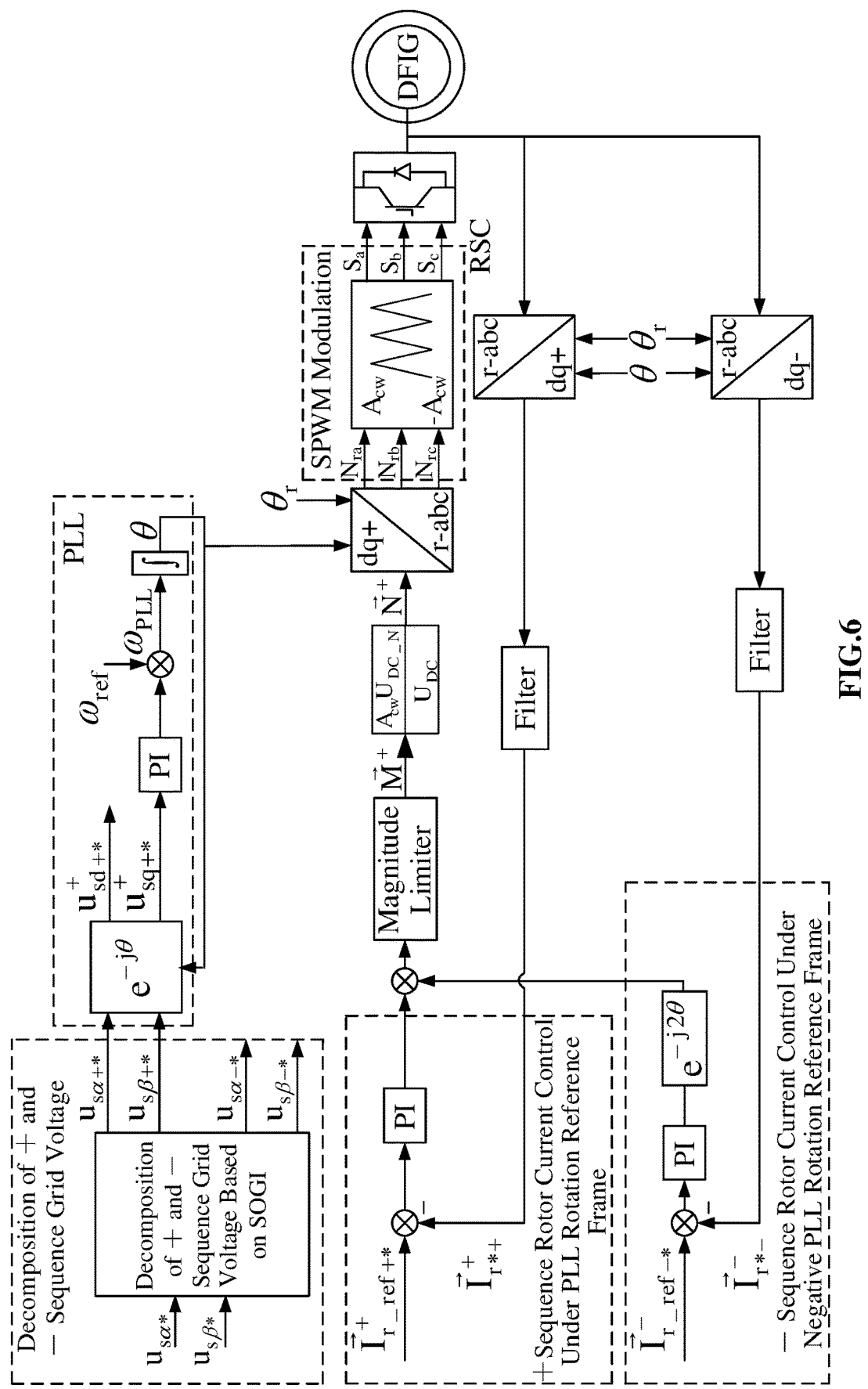
FIG. 6 is a block diagram of positive and negative sequence rotor currents control under a double dq-PI control structure.

Meanwhile, a grid-connected electromagnetic transient simulation model of the DFIG with double dq-PI control structure is built for comparison, and its control diagram is shown in FIG. 6. The proportional and integral parameters of the positive and negative sequence PI regulators are the same. The other options are same with the options of the scene under the single dq-PI control structure.

Case 1: A single-phase-to-ground short-circuit fault occurs on the 10 km line at the t=0.1 s. $K_{Q_{neg}}$=3 before t=0.1 s and becomes to 4 after 0.2 s.

Figure 7:
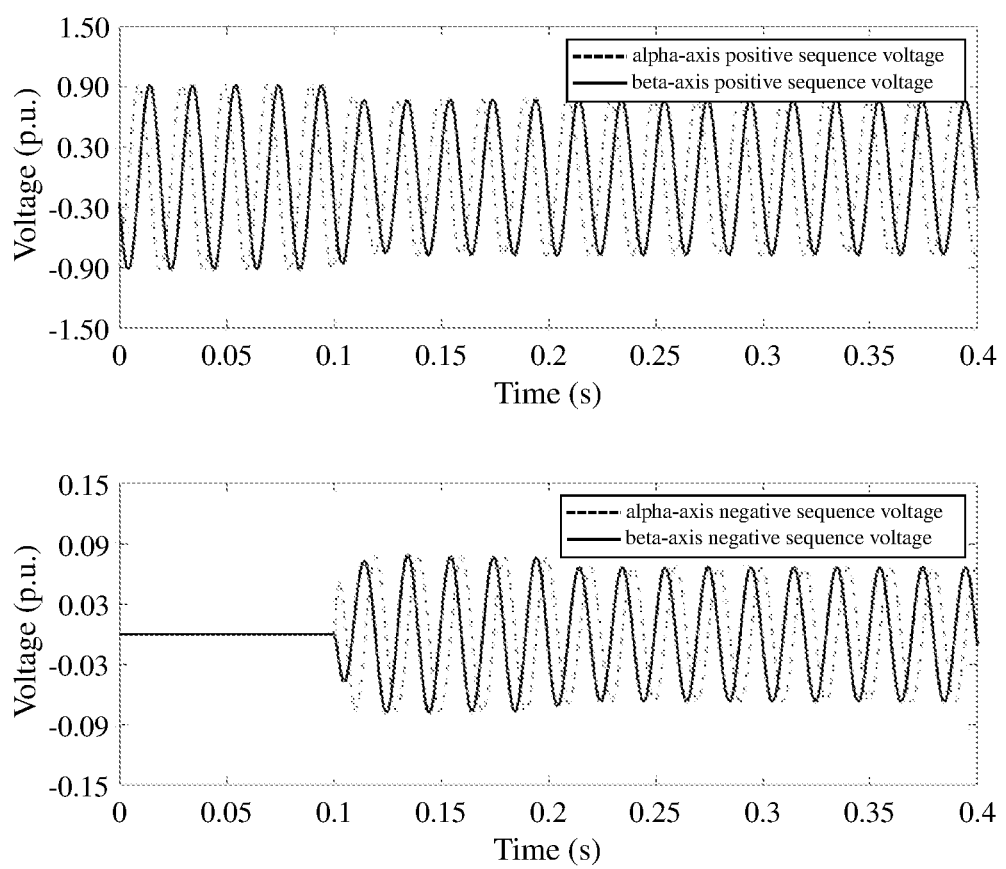
FIG. 7 is a waveform diagram of positive and negative sequence voltages decomposed by the second-order generalized integration method of the present invention in the simulation system.

(1) Response of the positive and negative sequence rotor current control under the proposed single dq-PI control structure The waveforms of the positive and negative sequence stator voltages decomposed by the second-order generalized integrator are shown in FIG. 7.

Figure 8:
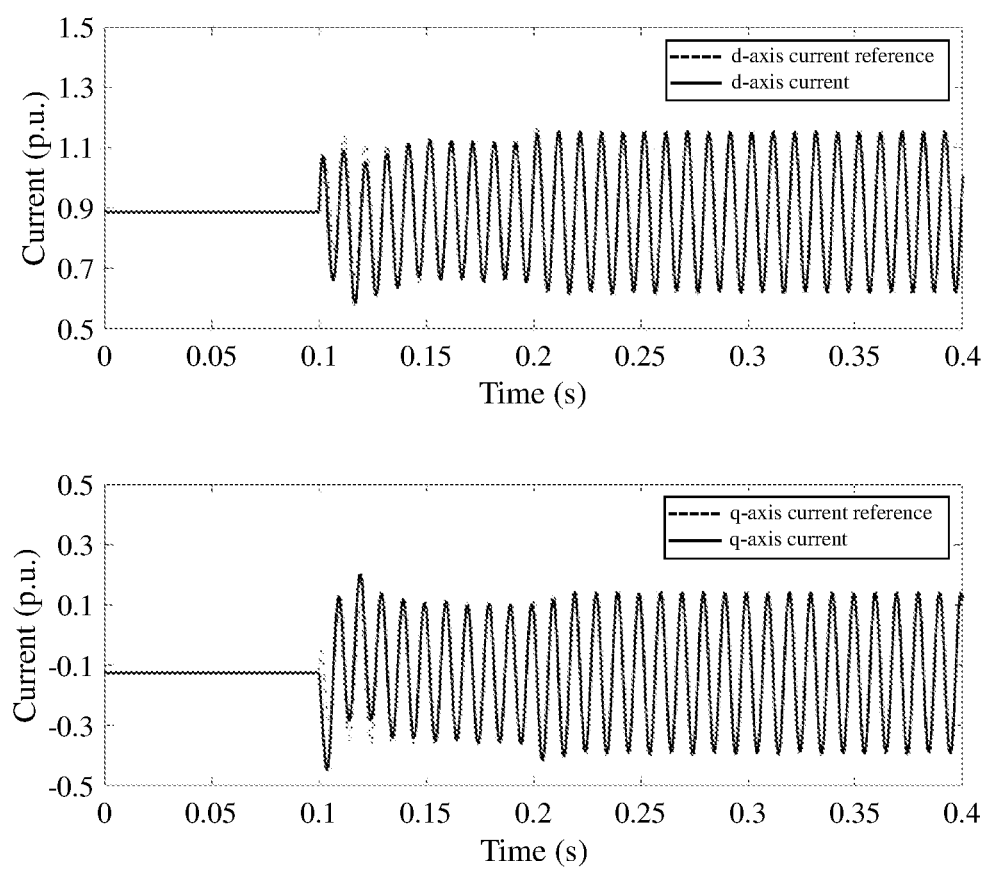
FIG. 8 is a comparison waveform diagram of the positive and negative sequence rotor current reference and the rotor current in the forward-rotating dq coordinate system of the present invention in the simulation system.

The negative sequence rotor current reference $\vec{I}_{r\_ref-*}^{-}$ in the reverse-rotating dq coordinate system is converted into the forward-rotating dq coordinate system, and then is combined with the positive sequence rotor current reference $\vec{I}_{r\_ref+*}^{+}$ in the forward-rotating dq coordinate system. The combined value is compared with the rotor current $\vec{I}_{r*}^{+}$ in the forward-rotating dq coordinate system, as shown in FIG. 8.

Figure 9:
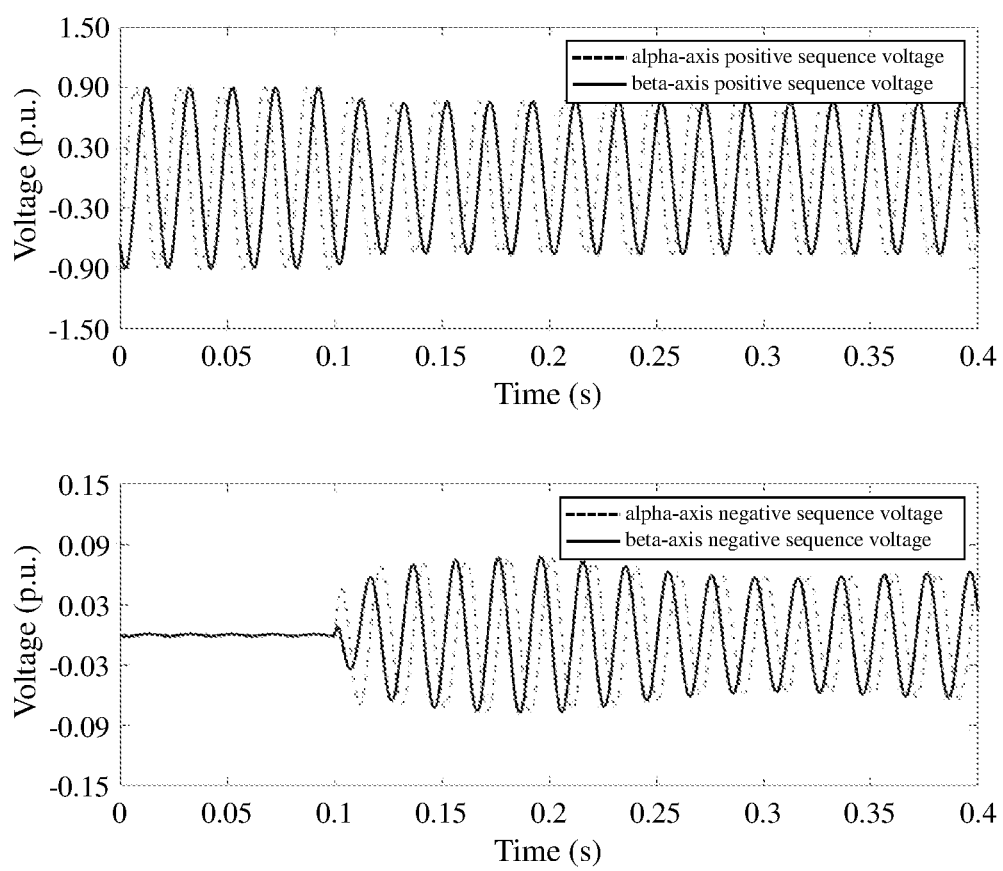
FIG. 9 is a waveform diagram of positive and negative sequence voltages decomposed by the second-order generalized integration method under the double dq-PI control structure in the simulation system.
Figure 10:
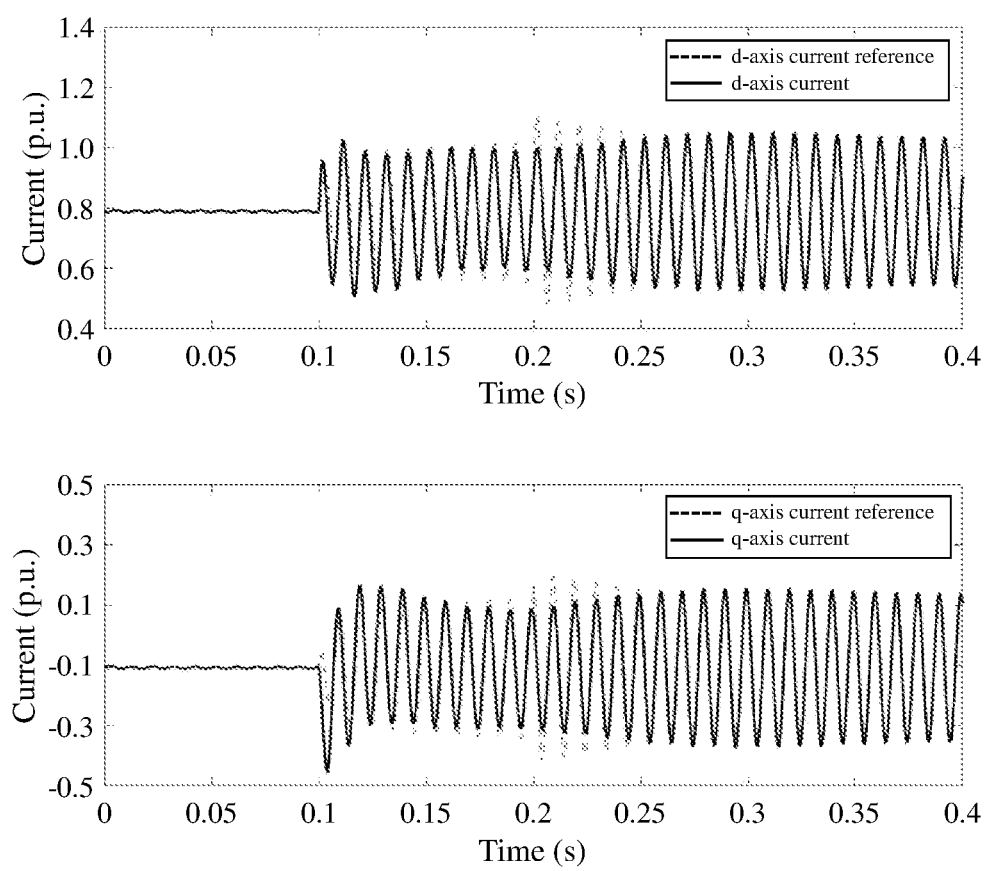
FIG. 10 is a comparison waveform diagram of the positive and negative sequence rotor current reference and the rotor current in the forward-rotating dq coordinate system of the double dq-PI control structure in the simulation system.

(2) Response of the positive and negative sequence rotor current control under the double dq-PI control structure Under the same fault disturbance, the waveforms of the positive and negative sequence stator voltages, and the waveforms of the comparison of the positive and negative sequence rotor current reference with the rotor current in the forward-rotating dq coordinate system, under the double dq-PI control structure, are shown in FIGS. 9 to 10.

Comparing Case 1(1) and Case 1(2), the proposed positive and negative sequence rotor current control scheme under the single dq-PI control structure is significantly better than the control scheme under the double dq-PI control structure, in terms of dynamic response indexes, such as the overshoot amount and the time to reach steady state. And because the scheme under the single dq-PI control structure can control the current fast and accurate, the stator voltage is more stable. However, the scheme under the double dq-PI control structure affects the stability of the stator voltage due to the existence of a longer dynamic on the current control, especially the negative sequence stator voltage.

Case 2: Response of the positive and negative sequence current control under the proposed single dq-PI control structure to the Case 1 scenario with different PI regulator parameters Under the balanced grid condition, the current control PI regulator parameters need to be designed so that the single dq-PI control structure has a range of PI parameters for positive sequence rotor current control with good dynamic performance. Under the unbalanced grid conditions, it needs to be verified whether different current control PI parameters selected for the positive sequence rotor current control have significant impact on the negative sequence rotor current control with the proposed method.

The following are simulation analyses of the influences of different PI regulator parameters on the dynamic performance of the positive and negative sequence rotor current control under the proposed single dq-PI control structure.

Figure 11:
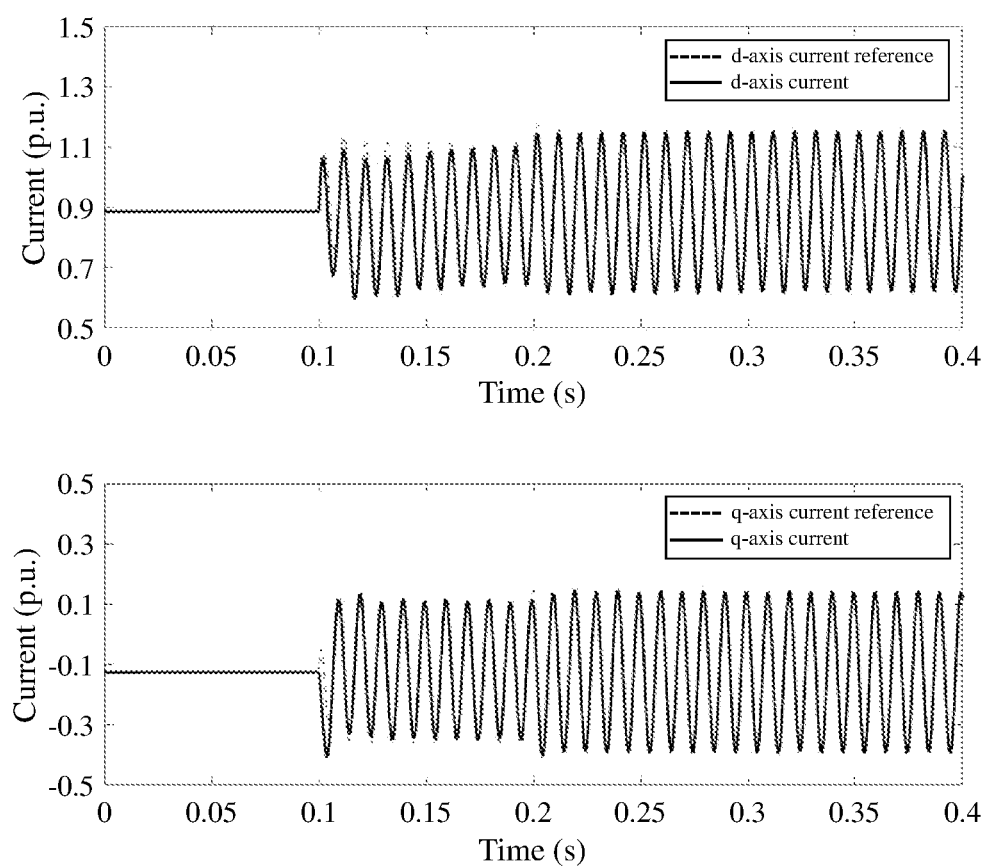
FIG. 11 is a comparison waveform diagram of the positive and negative sequence rotor current reference and the rotor current in the forward-rotating dq coordinate system of the present invention in the simulation system with $K_P=1.0$, $K_i=20$.

(1) $K_P$=1, $K_i$=20, the comparison of the positive and negative sequence rotor current references and the rotor currents in the forward-rotating dq coordinate system is shown in FIG. 11.

Figure 12:
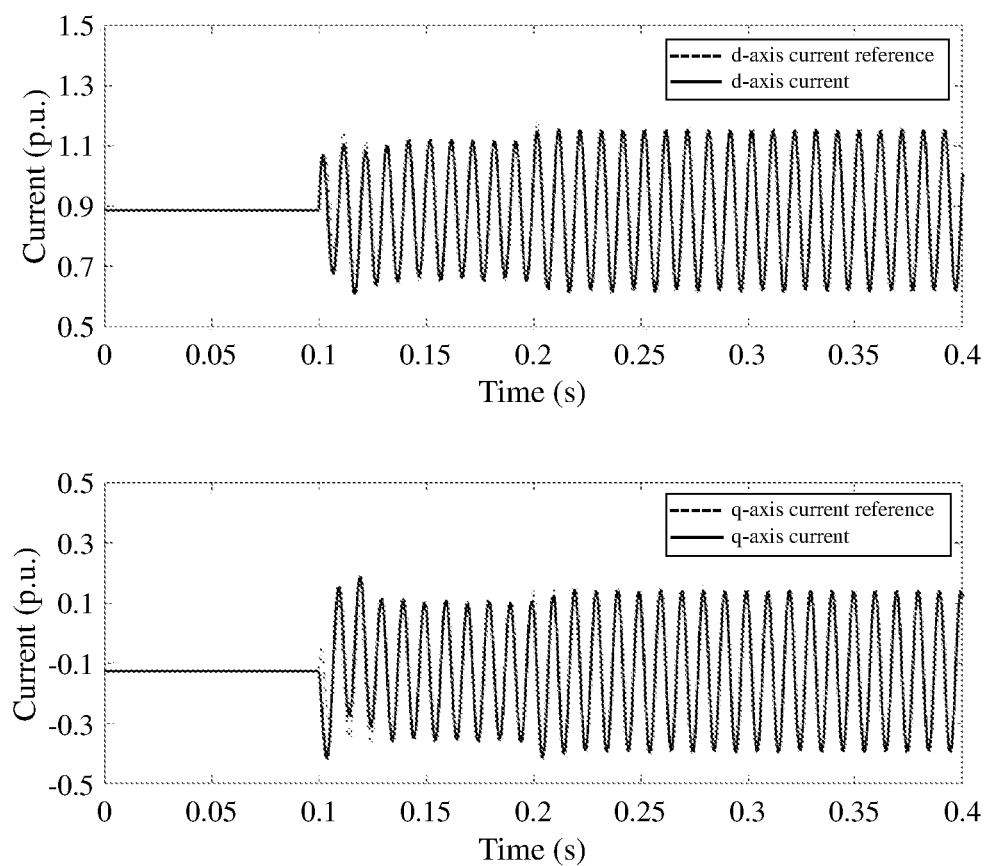
FIG. 12 is a comparison waveform diagram of the positive and negative sequence rotor current reference and the rotor current in the forward-rotating dq coordinate system of the present invention in the simulation system with $K_P=0.8$, $K_i=60$.

(2) $K_P$=0.8, $K_i$=60, the comparison of the positive and negative sequence rotor current reference values and the rotor currents in the forward-rotating dq coordinate system is shown in FIG. 12.

The above results show that the positive and negative sequence rotor current control method under single dq-PI control structure can achieve a similar good dynamic performance under different PI regulator parameters, with good adaptability and robustness.

According to the technical solution of the present invention, it finds that the DFIG under the single dq-PI control structure also has the potential to control the negative sequence rotor current under unbalanced grid conditions. By adding a negative sequence rotor current reference adjustment function, the DFIG under the single dq-PI control structure can have good negative sequence rotor current control ability. This method retains the good control performance of the single dq-PI control structure for the positive sequence rotor current, and enables the control of negative sequence rotor current under unbalanced conditions. The control structure does not need to be switched between the balanced and unbalanced operation. The order of the control system is decreased compared to the existing methods. The above characteristics reduce the complexity of the control and make the unbalanced transient analysis of the DFIG simplified. Simulation results prove good dynamic performances of the proposed method.

Example 2

According to the same inventive concept, an object of the example is to provide a computing device, comprising a memory, a processor and a computer program stored in the memory and runnable on the processor, wherein the processor executing the program to implement the specific steps of the method of the above examples.

Example 3

According to the same inventive concept, an object of the example is to provide a computer readable storage medium. The computer readable storage medium has a computer program stored thereon, wherein the program being executed by the processor to implement the specific steps of the method of the above examples.

Example 4

According to the same inventive concept, the example discloses a system for positive and negative sequence rotor current control of a DFIG under a single dq-PI control structure, comprising:
  a positive and negative sequence stator voltages extraction module, being configured to extract positive and negative sequence components of a stator voltage of a DFIG;
  a positive sequence stator voltage phase-locked-loop module, being configured to track and phase lock the positive sequence stator voltage to establish a forward-rotating dq coordinate system;
  a negative sequence current reference adjustment module, being configured to adjust a negative sequence rotor current reference according to the negative sequence stator terminal voltage to obtain a reference adjustment value of the negative sequence rotor current;
  a rotor current reference synthesis module, being configured to superimpose the reference adjustment value of the negative sequence rotor current with a positive sequence rotor current reference in the forward-rotating dq coordinate system;
  a rotor current feedback control module, being configured to generate an output voltage reference of a rotor-side converter according to the synthesis signal of the reference adjustment value of the negative sequence rotor current and the positive sequence rotor current reference; and
  a switching signal module, being configured to obtain a sequence of switching signal of the rotor-side converter according to the output voltage reference, and determine the turn-on or turn-off of switching devices to control the output voltage of the rotor-side converter.

The steps involved in the device of the above example correspond to those of Example 1 of the method, as described in the relevant section of Example 1. The term "computer readable storage medium" should be understood to mean a single medium or a plurality of media comprising one or more instruction sets; it should also be understood to include any medium that is capable of storing, encoding or carrying a set of instructions for execution by a processor and enabling the processor to perform any of the methods of the present invention.

It should be understood by those skilled in the art that the modules or steps of the present invention described above may be implemented with a generic computer device, optionally they may be implemented with program code executable by a computing device, and thus they may be stored in a storage device for execution by a computing device, or they may be made separately into individual integrated circuit modules, or multiple modules or steps thereof may be made into a single The present invention is not limited to any particular The present invention is not limited to any particular combination of hardware and software.

The foregoing descriptions are merely preferred embodiments of the present invention, but not intended to limit the present invention. A person skilled in the art may make various alterations and variations to the present invention. Any modification, equivalent replacement, or improvement made within the spirit and principle of the present invention shall fall within the protection scope of the present invention.

Although the specific embodiments of the present invention are described above in combination with the accompanying drawings, it is not a limitation on the protection scope of the present invention. Those skilled in the art should understand that on the basis of the technical scheme of the present invention, various modifications or deformations that can be made by those skilled in the art without creative labor are still within the protection scope of the present invention.

What is claimed is:

1. A method for positive and negative sequence rotor currents control of a doubly-fed wind turbine generator under a single dq control structure, comprising:
  extracting positive and negative sequence components of a stator terminal voltage of a doubly-fed wind turbine generator;
  tracking and phase locking the positive sequence components of the stator terminal voltage;
  adjusting a reference value $\overset{1}{I}_{r\_ref-*}^{-}$ of a negative sequence rotor current according to the negative sequence stator terminal voltage to obtain a reference adjustment value of the negative sequence rotor current, a conversion formula for adjusting is:

$$\overset{1}{I}_{r\_com-*}^{-} = \frac{\overset{1}{I}_{r\_ref-*}^{-} - K_{U_{neg}} \overset{1}{U}_{s-*}^{-}}{K_{ref}},$$

wherein, $\overset{1}{I}_{r\_com-*}^{-}$ is the reference adjustment value, $\overset{1}{I}_{r\_ref-*}^{-}$ is the negative sequence rotor current reference value, the $K_{ref}$ and $K_{U_{neg}}$ depend on parameters of the doubly-fed wind turbine generator, and vary with $\omega_{PLL}$ and $\omega_r$, and need to be updated in real time according to the $\omega_{PLL}$ and $\omega_r$, wherein $\omega_{PLL}$ is a rotational speed of a forward-rotating dq coordinate system, and $\omega_r$ is the rotational speed of a rotor; $\vec{I}_{r\_ref-*}^{-}$
  superimposing the reference adjustment value of the negative sequence rotor current with a reference value of a positive sequence rotor current in the forward-rotating dq coordinate system as an input to a PI current feedback control function in the forward-rotating dq coordinate system; and
  controlling turn-on and turn-off of a switching device by using a switching signal of a rotor-side converter obtained from the PI current feedback control function, then controlling a output voltage of the rotor-side converter.

2. The method for positive and negative sequence rotor currents control of the doubly-fed wind turbine generator under the single dq control structure according to claim 1, further comprising:

separating positive and negative sequence components of a grid voltage in α β coordinate system using a second-order generalized integrator.

3. The method for positive and negative sequence rotor currents control of the doubly-fed wind turbine generator under the single dq control structure according to claim 2, further comprising:

inputting the negative sequence component to a negative sequence rotor current reference value adjustment function.

4. The method for positive and negative sequence rotor currents control of the doubly-fed wind turbine generator under the single dq control structure according to claim 2, further comprising:

inputting the positive sequence component to a phase-locked loop to track and phase lock a positive sequence stator voltage vector for references of coordinate conversion and current control.

5. The method for positive and negative sequence rotor currents control of the doubly-fed wind turbine generator under the single dq control structure according to claim 1, further comprising:

converting an output signal of the PI current feedback control function into a rotor three-phase coordinate system to form a three-phase modulated signal; and comparing the three-phase modulated signal with a triangular carrier signal to obtain a rotor-side converter switching signal to control turn-on and turn-off of a switching device.

6. A system for positive and negative sequence rotor currents control of a doubly-fed wind turbine generator under a single dq control structure, comprising:

a stator positive and negative sequence voltages separation and extraction module, configured to extract positive and negative sequence components of a stator terminal voltage of a doubly-fed wind turbine generator;

a stator positive sequence voltage phase locked loop module, configured to track and phase lock the positive sequence components of the stator terminal voltage;

a negative sequence current reference value adjustment module, configured to adjust a reference value $\overset{\text{\tiny 1}}{I}_{r\_ref-*}^{-}$ of a negative sequence rotor current according to a negative stator terminal voltage to obtain a reference adjustment value of the negative sequence rotor current, wherein a conversion formula for adjusting is:

$$\overset{r-}{I}_{r\_com-*} = \frac{\overset{\text{\tiny 1}-}{I}_{r\_ref-*} - K_{U_{neg}} \overset{\text{\tiny 1}-}{U}_{s-*}}{K_{ref}},$$

wherein, $\overset{\text{\tiny 1}}{I}_{r\_com-*}^{-}$ is the reference adjustment value, $\overset{\text{\tiny 1}}{I}_{r\_ref-*}^{-}$ is the negative sequence rotor current reference value, the $K_{ref}$ and $K_{U_{neg}}$ depend on parameters of the doubly-fed wind turbine generator, and vary with $\omega_{PLL}$ and $\omega_r$, and need to be updated in real time according to the $\omega_{PLL}$ and $\omega_r$, wherein $\omega_{PLL}$ is the a rotational speed of a forward-rotating dq coordinate system, and $\omega_r$ is the rotational speed of a rotor;

a rotor current feedback control module, configured to superimpose the negative sequence rotor current reference adjustment value with a positive sequence rotor current reference value in a forward-rotating dq coordinate system as an input to a PI current feedback control function in the forward-rotating dq coordinate system; and a switching signal module, configured to obtain a switching signal of a rotor-side converter using the PI current feedback control function, and control the turn-on and turn-off of the switching device to control an output voltage of the rotor-side converter.

7. A computing device, comprising:

a memory;

a processor; and a computer program stored in the memory and executable on the processor, wherein the processor executes the computer program to implement the method according to claim 1.

8. A non-transitory computer readable storage medium, having a computer program stored thereon, wherein the computer program is executed by a processor to implement the method according to claim 1.

9. A doubly-fed wind turbine generator, wherein the doubly-fed wind turbine generator performs control of positive and negative sequence rotor currents using a rotor current control instruction obtained by the method according to claim 1.

* * * * *